(12) United States Patent
Howe

(10) Patent No.: US 10,078,559 B2
(45) Date of Patent: Sep. 18, 2018

(54) SYSTEM AND METHOD FOR INPUT DATA FAULT RECOVERY IN A MASSIVELY PARALLEL REAL TIME COMPUTING SYSTEM

(71) Applicant: Raytheon Company, Waltham, MA (US)

(72) Inventor: Benjamin M Howe, Plano, TX (US)

(73) Assignee: Raytheon Company, Waltham, MA (US)

( * ) Notice: Subject to any disclaimer, the term of this patent is extended or adjusted under 35 U.S.C. 154(b) by 3 days.

(21) Appl. No.: 15/166,724

(22) Filed: May 27, 2016

(65) Prior Publication Data
US 2017/0344439 A1    Nov. 30, 2017

(51) Int. Cl.
*G06F 11/00* (2006.01)
*G06F 11/14* (2006.01)

(52) U.S. Cl.
CPC .... *G06F 11/1471* (2013.01); *G06F 2201/805* (2013.01); *G06F 2201/81* (2013.01); *G06F 2201/835* (2013.01)

(58) Field of Classification Search
CPC ............. G06F 11/1471; G06F 11/0706; G06F 11/0715; G06F 11/0724; G06F 11/1675;
(Continued)

(56) References Cited

U.S. PATENT DOCUMENTS

| 5,481,719 A | 1/1996 | Ackerman et al. |
| 8,156,493 B2 | 4/2012 | Ellis et al. |

(Continued)

FOREIGN PATENT DOCUMENTS

| EP | 1330900 B1 | 9/2007 |
| EP | 2866144 A1 | 4/2015 |

(Continued)

OTHER PUBLICATIONS

"U.S. Appl. No. 14/289,852, Advisory Action dated Apr. 14, 2017", 3 pgs.

(Continued)

*Primary Examiner* — Joseph D Manoskey
(74) *Attorney, Agent, or Firm* — Schwegman, Lundberg & Woessner, P.A.

(57) ABSTRACT

A massively parallel real-time computing system receives input data events across many compute nodes, each with a processing algorithm in its processing pipeline. An Event Manager is placed before the algorithm processing pipelines, receives metadata about each incoming event, and collects and organizes it in a database. A fast histogram compares the metadata about each event to that of all the other events, in a processing interval. For sufficiently matching metadata, the events are forwarded to the processing nodes as "regular" events for processing. If the metadata for a processing interval does not match sufficiently, the histogram decides which events are the "correct" events and which events are "incorrect." The "correct" events are sent on for processing and the "incorrect" events are combined with the "correct" metadata and sent back to the processing nodes to supplement or modify their incoming data to match the other nodes' expectations.

20 Claims, 10 Drawing Sheets

(58) Field of Classification Search
CPC .............. G06F 11/3017; G06F 11/3041; G06F 11/3404; G06F 2201/805; G06F 2201/81; G06F 2201/835

See application file for complete search history.

(56) References Cited

U.S. PATENT DOCUMENTS

| | | | |
|---|---|---|---|
| 8,260,492 | B2 | 9/2012 | Stange et al. |
| 2004/0019744 | A1 | 1/2004 | Boucher |
| 2008/0189573 | A1* | 8/2008 | Darrington ......... G06F 11/0724 714/11 |
| 2010/0042632 | A1* | 2/2010 | Johnson .............. G06F 11/3476 707/725 |
| 2010/0293532 | A1* | 11/2010 | Andrade ............. G06F 11/1438 717/140 |
| 2011/0191785 | A1 | 8/2011 | Archer et al. |
| 2011/0283262 | A1 | 11/2011 | Ceze et al. |
| 2012/0137164 | A1* | 5/2012 | Uhlig ................... G06F 11/004 714/4.11 |
| 2015/0347131 | A1 | 12/2015 | Howe et al. |
| 2016/0092317 | A1* | 3/2016 | Akiyama ............. H04L 1/0084 714/20 |

FOREIGN PATENT DOCUMENTS

| | | |
|---|---|---|
| TW | 201741878 A | 12/2017 |
| WO | WO-2017204893 A1 | 11/2017 |

OTHER PUBLICATIONS

"U.S. Appl. No. 14/289,852, Advisory Action dated Jul. 13, 2016", 6 pgs.

"U.S. Appl. No. 14/289,852, Examiner Interview Summary dated May 17, 2017", 3 pgs.

"U.S. Appl. No. 14/289,852, Examiner Interview Summary dated Jun. 9, 2016", 3 pgs.

"U.S. Appl. No. 14/289,852, Examiner Interview Summary dated Jul. 28, 2017", 3 pgs.

"U.S. Appl. No. 14/289,852, Final Office Action dated Jan. 12, 2017", 13 pgs.

"U.S. Appl. No. 14/289,852, Final Office Action dated Mar. 11, 2016", 12 pgs.

"U.S. Appl. No. 14/289,852, Non Final Office Action dated Jun. 28, 2017", 12 pgs.

"U.S. Appl. No. 14/289,852, Non Final Office Action dated Jul. 30, 2015", 11 pgs.

"U.S. Appl. No. 14/289,852, Non Final Office Action dated Aug. 26, 2016", 13 pgs.

"U.S. Appl. No. 14/289,852, Response filed Mar. 8, 2017 to Final Office Action dated Jan. 12, 2017", 12 pgs.

"U.S. Appl. No. 14/289,852, Response filed Aug. 9, 2017 to Non-Final Office Action dated Jun. 28, 2017", 10 pgs.

"U.S. Appl. No. 14/289,852, Response filed Nov. 30, 2015 to Non-Final Office Action dated Jul. 30, 2015", 13 pgs.

"U.S. Appl. No. 14/289,852, Response filed Dec. 1, 2016 to Non-Final Office Action dated Aug. 26, 2016", 13 pgs.

"U.S. Appl. No. 14/289,852, Response filed May 10, 2017 to Final Office Action dated Jan. 12, 2017", 9 pgs.

"U.S. Appl. No. 14/289,852, Examiner Interview Summary dated Mar. 3, 2017", 5 pgs.

"U.S. Appl. No. 14/289,852, Response filed Jun. 7, 2016 to Final Office Action dated Mar. 11, 2016", 11 pgs.

"International Application Serial No. PCT/US2017/023989, International Search Report dated Jul. 13, 2017", 5 pgs.

"International Application Serial No. PCT/US2017/023989, Written Opinion dated Jul. 13, 2017", 10 pgs.

"Linux Programmer's Manual—pthread_setcancelstate", (Mar. 20, 2012), 3 pgs.

Fagg, Graham E, et al., "Building and Using a Fault-Tolerant MPI Implementation", (2004), 10 pgs.

Howe, Ben, "System and Method for Input Data Fault Recovery in a Massively Parallel Realtime Computing System", Raytheon Proprietary, (Aug. 30, 2015), 8 pgs.

Kumar, Arvind, et al., "Fault Tolerance in Real Time Distributed System", International Journal on Computer Science and Engineering. vol. 3 No. 2., (Feb. 2011), 933-939.

Peng, Li, et al., "Deadlock avoidance for streaming computations with filtering", Parallelism in Algorithms and Architectures, ACM, 2 Penn Plaza, Suite 701 New York NY 10121-0701 USA,, (Jun. 13, 2010), 243-252.

Probe, et al., "MPI—2.2 documentation", (Sep. 10, 2009), 5 pgs.

Stephen, Cleary, "Detection of Half-Open (Dropped) Connections", (May 16, 2009), 19 pgs.

"U.S. Appl. No. 14/289,852, Non Final Office Action dated Dec. 26, 2017", 11 pgs.

"U.S. Appl. No. 14/289,852, Response filed Apr. 25, 2018 to Non-Final Office Action dated Dec. 26, 2017", 12 pgs.

"U.S. Appl. No. 14/289,852, Examiner Interview Summary dated Apr. 5, 2018", 3 pgs.

* cited by examiner

| | 0 | 1 | 2 | 3 | 4 |
|---|---|---|---|---|---|
| 1 | METADATA FOR DATA CHANNEL 1, PROCESSING INTERVAL 1 | 1,1 | | | |
| 2 | METADATA FOR DATA CHANNEL 2, PROCESSING INTERVAL 1 | METADATA FOR DATA CHANNEL 2, PROCESSING INTERVAL 2 | 2,2 | | |
| 3 | METADATA FOR DATA CHANNEL 3, PROCESSING INTERVAL 1 | METADATA FOR DATA CHANNEL 3, PROCESSING INTERVAL 2 | 3,2 | | |
| 4 | METADATA FOR DATA CHANNEL 4, PROCESSING INTERVAL 1 | 4,1 | | | |

N ROWS

T COLUMNS

*FIG. 10*

SYSTEM AND METHOD FOR INPUT DATA FAULT RECOVERY IN A MASSIVELY PARALLEL REAL TIME COMPUTING SYSTEM

GOVERNMENT RIGHTS

This invention was made with Government support under WITHHELD awarded by the Department of Defense. The Government has certain rights in this invention.

BACKGROUND

The present disclosure relates generally to facilitating input data fault recovery in a massively parallel computing applications, and more specifically, to a system for preventing failure between processes of a parallel computing application.

Massively parallel computing applications typically require complicated communication between nodes that is dependent on input data distributed across many nodes. In real time environments, such as in a multi-mode radar system, there might be N antenna beams each requiring computation at a single node, and M subswaths that generate M threads for computation at each node.

BRIEF DESCRIPTION OF THE DRAWINGS

The subject matter herein is particularly pointed out and distinctly claimed in the claims at the conclusion of the specification. The foregoing and other features, and advantages of the disclosure are apparent from the following detailed description taken in conjunction with the accompanying drawings in which:

FIG. 10 depicts diagrammatically the Event Manager database as a two-dimensional metadata array, according to some embodiments.

DETAILED DESCRIPTION

Figure 1:
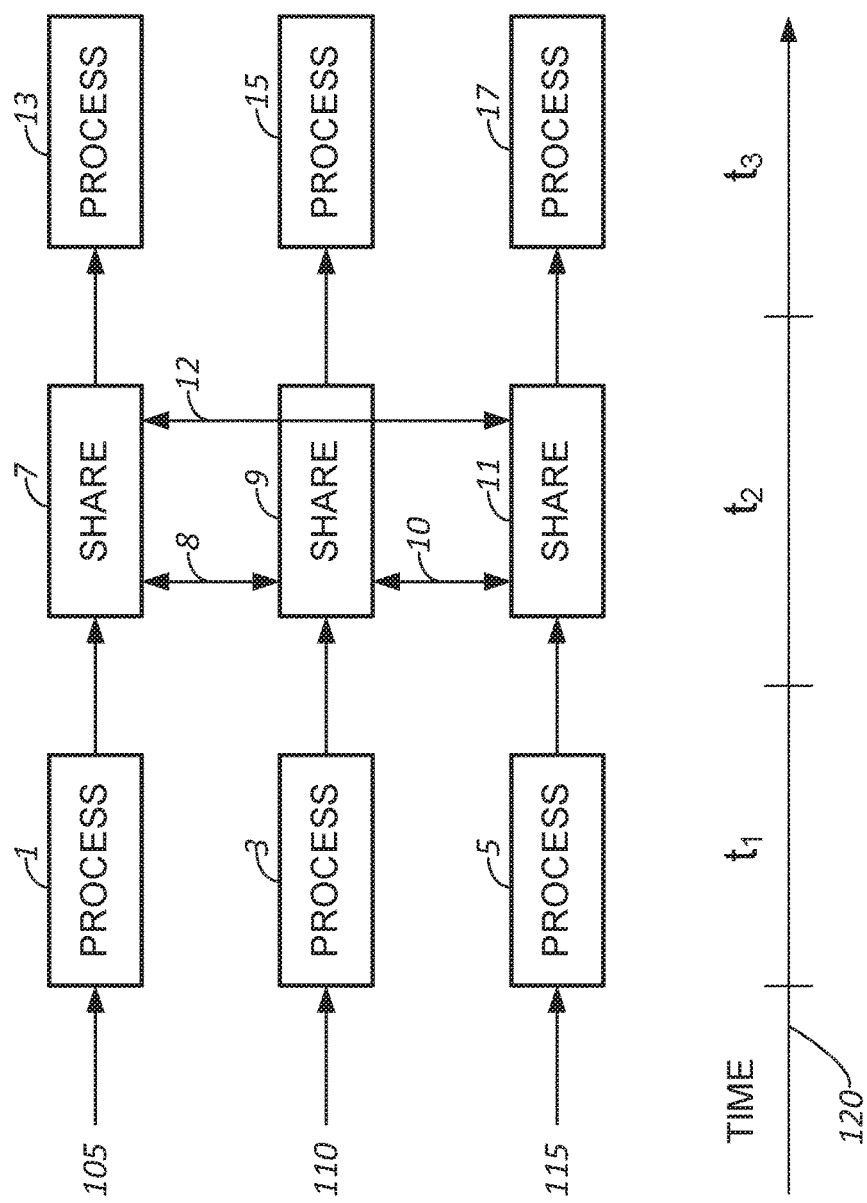
FIG. 1 depicts processing pipelines for several processes of an application running in parallel, according to some embodiments.

A real time massively parallel processing system typically includes several computers executing several processes in parallel for processing data in real time. In some cases, a real time parallel processing system runs one application for one data type at a time because of restrictions in real time memory usage or in order to meet throughput requirements for processing data in real time. Occasionally, a parallel processing system integrates data before initiating a batch processing sequence for running processes of an application in different computers in parallel. Once the parallel processing system has initiated a batch processing, the parallel processing system performs intense computations that heavily utilize both central processing units (CPUs) and input/output (I/O) connections between the processes of the application. In such a scenario, most of the processes of the application are performing similar operations on different sets of data (e.g., single instruction, multiple data (SIMD) instructions). Intermediate calculation results are often shared among the processes by using inter-process communication protocols (e.g., via a Message Passing Interface (MPI)).

Such a massively parallel real time computing system can receive input data distributed across many nodes. Oftentimes, the downstream algorithms in the computing system require communication between the nodes to process the data. If input data is missing from one or more of the nodes (or is corrupt), the downstream communications between the nodes are doomed to fail because the node missing data will not know that it missed any data (and so it won't participate in the communications). These communication timeouts can cause input buffers to overflow and can therefore be fatal to a real time system. Described is a very efficient method for detecting missing data (or corrupt data) and notifying the otherwise-ignorant compute nodes that data was missed (or corrupted) so they can continue processing as if they received valid data. Prior attempts to solve this problem centered on the idea of using timeouts at each communication point in the algorithms. If the communication failed after a fixed length timeout, the algorithm would perform alternate processing so as to minimize the failure's effects on the downstream algorithms. If data was missing, the communication timeout (set to a little bit less than the spare time in one processing interval) would be tripped, and the downstream processing would continue in the best possible manner. However, if there is little or no spare time in the "average" processing interval, that timeout would have to be very small. Interval to interval variance could easily cause the timeout to trip unnecessarily and even possibly quite regularly. Furthermore, all the nodes would need to be notified of a specific node's absence after a timeout is detected, but doing this during the algorithm processing would be tricky and prone to race conditions. But if the other nodes were not notified of the failure, they might eventually try to communicate with the absent node, and that would cause the timeouts to compound very quickly and cause real time deadlines to be missed. Consequently, input buffers will overflow and irrecoverable errors will occur. A solution to the problem of input buffer overflow that allows a parallel processing system to survive intermittent or permanent input data channel failures without cross-compute node communications time out or lockup is therefore desirable.

A real time "Event Manager" can be placed conceptually to operate before the algorithm processing begins (instead of using communication timeouts as attempted in earlier attempts so solve the problem) and resolve the above problem. This increases the latency of the processing system but only by a very small amount, and it does not affect the throughput of the system in any significant way, while at the same time preventing overflow of the input buffers. The Event Manager is responsible for receiving event notifications from the computing nodes and distributing events and pseudo-events back out to all the compute nodes. As used herein, "event" in some embodiments means notification that regular data has arrived during a processing interval while "pseudo-events" in some embodiments means that there is "irregular" data during a processing interval (where "irregular" can mean incorrect data or missing data). The Event Manager very quickly tracks and groups the events into the correct processing intervals by using a simplified histogram formulation to have the events "vote" on key characteristics of the actual data (like the length of the input data, the time of the subevents in the input data, and other key metadata elements in the input data). This allows the Event Manager to detect corrupt data and notify the otherwise-ignorant compute nodes about their corrupt data. That also means the Event Manager does not need "master data" from a single input data provider. It can infer that data from all the individual nodes' metadata using low-throughput and low-latency algorithms. As used herein, the term "metadata" is data about an event and is usually included in the header of a data packet or other data format. In some embodiments, the key fields of the header comprise the timestamp of the event, at least for the reason that the timestamp must be synchronized, at least within a given tolerance, across the input channels. Another key field in the header comprises whatever other information in the header the downstream processing algorithms, which may vary in various embodiments, typically need to process the data. In some uses herein, metadata may be equated with the header or beam data header. Examples of metadata include:

a) The time of the event (e.g. the time of a frame of video, in an embodiment in which data comes from a video camera);

b) The "pointing location" of the data. For a radar system, this is the "steering angle" of the antenna. For a camera, this might be the Euler angles of the principal axis of the focal plane.

c) The unique data channel identifier of the data. In an embodiment in which data comes from a video camera, this would include which quadrant of the video the event is for.

d) The number of input channels used for this event. (e.g., 4 input channels if there are 4 quadrants of video in an embodiment in which data comes from a video camera. If the video were broken into 6 sub-images, then the number of input channels would be 6.)

Embodiments include a computer program product, a method, and a system for facilitating fault tolerant communication between and among threads of a process of a massively parallel real time computing system. According to an embodiment, a computer program product for facilitating input data fault recovery in a plurality of threads of a process is provided. The computer program product comprises a machine-readable storage medium having program instructions embodied therewith. The program instructions readable by a processing circuit cause the processing circuit to perform a method. The method maintains information about open communications between one or more of the threads of the process and one or more of other processes.

According to another embodiment, a computer system for facilitating input data fault recovery in of a plurality of threads of a process of a massively parallel real time computing system is provided, where the input data fault comprises corrupt input data or missing input data. The computer system comprises a memory having machine-readable instructions and a processor configured to execute the machine-readable instructions. The instructions comprise maintaining information about required communications between one or more of the threads of the process and one or more of other processes. The instructions further comprise processes for determining correct or incorrect input for the communications and generating procedures for preventing input buffer overflow.

According to a further embodiment, a computer implemented method for facilitating fault tolerant communication among a plurality of threads of a process of a massively parallel real time computing system is provided. In response to receiving incorrect input data, where the incorrect input data comprises corrupt input data or missing input data, pseudo data may be generated to enable the communication to continue and to prevent input buffer overflow.

FIG. 1 depicts processing pipelines for several processes of an application running in parallel on a computer system. The processes are of an application that is executed by a parallel processing system of the type alluded to above. In some cases, the processes are running in different computers. One computer may have one or more processes running. As an example, FIG. 1 shows three processing pipelines 105, 110, 115 for three processes of an application running in parallel. Each processing pipeline has three blocks that represent different stages of the pipeline. The time progression is shown as an arrow 120 pointing to the right side of the figure and is divided into time periods t1-t3. The blocks of different processing pipelines in the same time period (i.e., in the same column of processes of FIG. 1) represent processing stages being performed in parallel.

During the time period t1, the three processes 1, 3, 5, corresponding to the processes in the processing pipelines 105, 110, 115, process data in parallel. During the time period t2, the three processes exchange the processing results with each other, as indicated by the bidirectional arrows connecting the "share" blocks 7, 9, 11 in the second column. During the time period t3, the three processes process data in parallel again at 13, 15, 17 based on the exchanged data at the previous stage (t2). Typically, processes repeat these intermittent communications in order to exchange data between the processes running in parallel.

In some cases, a process running in a computer may be multi-threaded. In other words, the processing performed by each process may be performed by several threads that are also running in parallel. In such cases, the inter-process communications are communications between different threads of different processes. The threads of different processes that are scheduled to participate must all participate in the communication to exchange data, such as in t2, because, for example, a given thread may hang or wait for a long time when the given thread expects to receive data from another thread but never receives the expected data when the other thread does not participate in the communication.

Figure 2:
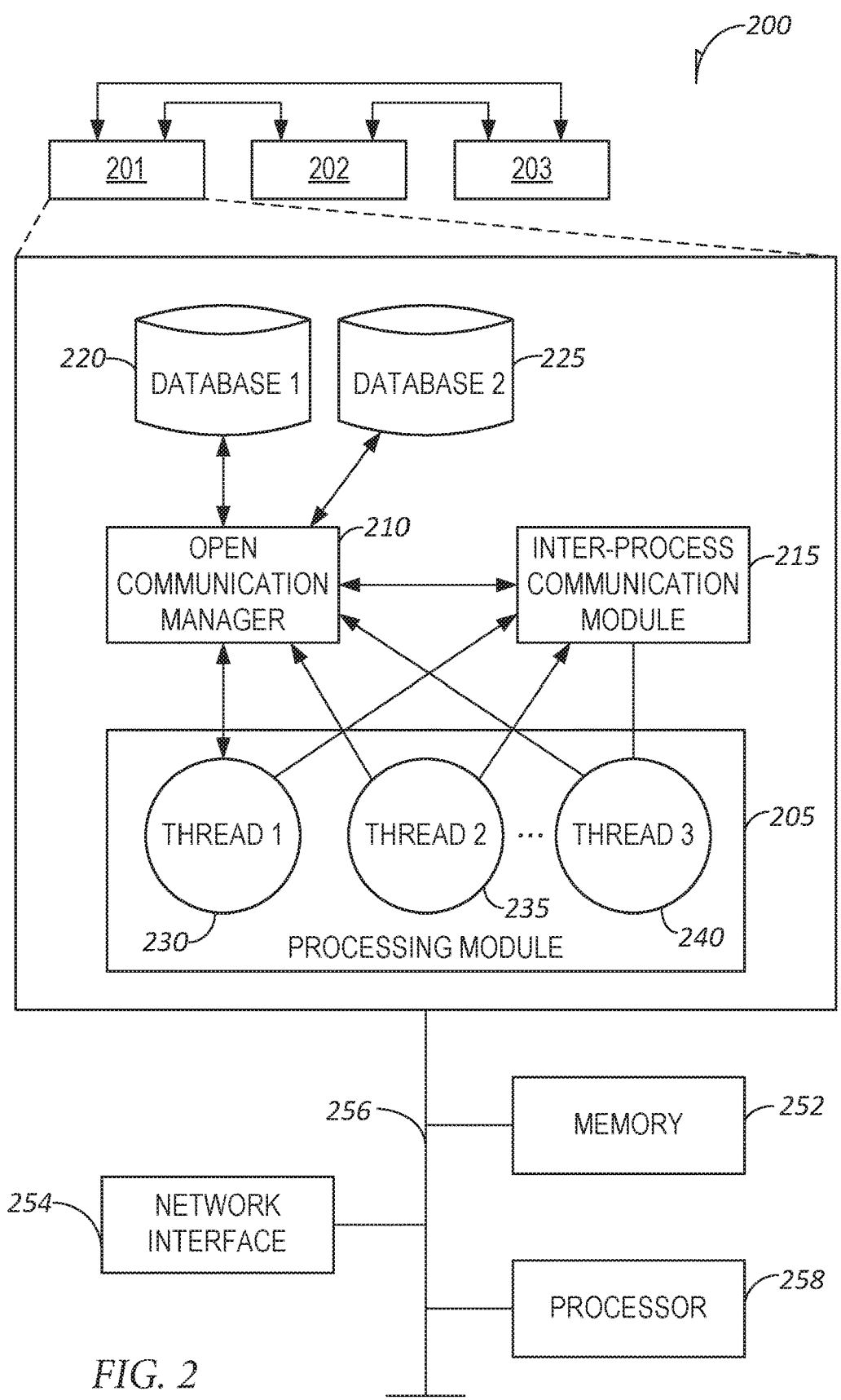
FIG. 2 depicts a block diagram of a computer that runs a process of an application executed by a parallel processing system, according to some embodiments.

FIG. 2 depicts a block diagram of a computer 201 that runs a process of an application executed by a parallel processing system 200 according to some embodiments. The claimed subject matter of this patent need not be incorporated in only the computer system described herein, inasmuch as the claimed subject matter is capable of operating in or as part of parallel processing computer systems of many varying designs and embodiments. The computer 201 is one of many computers within parallel processing 200, which is illustrated in FIG. 2 as comprising only additional computers 202, 203 due to space limitations. In practice there will be many such computers, each running at least one process of the application being executed by the parallel processing system 200. In some embodiments, the computer 201 includes a processing module 205, an open communication manager 210, and an inter-process communication module 215, and one or more databases 220 and 225.

The processing module 205 performs a process of the application in the computer 201. As shown, the process being performed by the processing module 205 is in a multithreaded environment and thus has several threads 230-240. One of these threads, thread 230, is a primary thread that is responsible for starting and shutting down the threads of the process. In some embodiments, the threads 230-240 process data. In some embodiments, the threads 230-240 use the inter-process communication module 215 to communicate with other processes of the application running in other computers (e.g., the computers 202 through 203).

The inter-process communication module 215 supports an inter-process communication protocol such as message passing interface (MPI) so that the threads 230-240 can exchange data with other processes running in the other computers 202 through 203 using the inter-process communication module 215. In some embodiments, the inter-process communication module 215 is configured to support MPI.

In some embodiments, the open communication manager 210 receives a request from a particular thread, 231, 236, or 241, of the process run by the processing module 205, and the request indicates that the particular thread has started or opened a communication with another processor in another computer. For instance, the particular thread sends a send message (e.g., MPI send) to the other process and sends a request to the open communication manager 210, indicating that the thread has an open communication with the other process. The open communication manager 210 stores the information about this communication as an entry in the database 220. Once the communication is completed (e.g., once the particular thread receives an acknowledgement from the other process such as MPI receive), the particular thread sends another request, which indicates that the particular thread has completed the communication with the other process, to the open communication manager 210. The open communication manager 210 removes the communication information for this request from the database 220. In this manner, the open communication manager 210 maintains information about all open communications between the threads 230 through 240 and other processes running in other computers 202 through 203.

In some embodiments, the open communication manager 210 may access databases managed by other open communication managers (not shown) running in other computers 202 through 203 to get the open communication information in the other computers, in order to facilitate completion of the open communications between the threads of the computer 201 and processes of the other computers. The open communication manager 210 completes the communications by initiating receive operations on behalf of the threads that are supposed to receive data from the processes in other computers. In these embodiments, the other communication managers running in other computers 202 through 203 may also access the databases 220 and 225.

In some embodiments, the open communication manager 210 is a library, like the inter-process communication module 215 is. That is, the threads 230-240 are programmed to make calls defined in this library in order to request that the communication information be added or removed from the database 220 or 225. In some embodiments, the databases 220 and 225 are implemented in a memory shared by the threads 230 and 240. In some embodiments, the open communication manager 210 is a stand-alone module that is separate from the processing module 205. In other embodiments, the open communication manager 210 may be a thread (e.g., the primary thread 230) run by the processing module 205 and is responsible for maintaining the open communications of other threads and completing open communications on behalf of other threads.

As used herein, the terms module and sub-module may refer to an application specific integrated circuit, an electronic circuit, a processor (shared, dedicated, or group) and memory that executes one or more software or firmware programs or a combinational logic circuit in a system. For example, in some embodiments, the modules 205, 210 and 215 may be communicatively connected (e.g., through a bus 256) to a memory 252 that may include the databases 220 and 225 to store and retrieve the communication information. The modules 205, 210 and 215 may also use a processor 258 to perform their operations. The modules 205, 210 and 215 may also be communicatively connected to a network interface 254 to exchange data with other processes running in the computers 202 through 203. In some embodiments, the modules 205, 210 and 215 may be combined or further partitioned.

In some cases, threads of a process perform communications into their own stacks. In other words, for a thread, the data to be sent out to another process and the data received from other processes are stored in the stack of the thread. Cleanup handlers perform any necessary cleanup after the thread is terminated. The data being sent out or received from other processes during the completion of the open communications by the open communication manager 210 on behalf of the thread is also placed in the stack of the thread. However, this data placed in the stack as part of communication completion may also interfere with the operation of the cleanup handlers for the thread if, for example, data arrives in the stack while the cleanup handlers are utilizing the stack. This may result in an undesirable behavior of the inter-process communication module 215.

In order to prevent data being placed in the stack of a thread as part of communication completion from interfering with a cleanup handler, a thread of some embodiments is configured to reserve a space in the stack for the cleanup handler. In some embodiments, this reserved stack space is placed at the beginning of the thread's stack by placing the stack pointer to the end of the reserved space when the thread is initially spawned. In this manner, the incoming data that is part of a communication completion is prevented from interfering with the stack space required for the cleanup handler when the thread is terminating.

Any of the machines, databases, or devices shown in FIG. 2 may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 11. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 2 may be combined into a single machine, and the functions described herein for any single machine, database, or device may be subdivided among multiple machines, databases, or devices.

Additional operations and functions of massively parallel computing applications may be seen in co-pending U.S. patent application Ser. No. 14/289,852 entitled "Fast Transitions for Massively Parallel Computing Applications" which is hereby incorporated herein by reference in its entirety.

Figure 3:
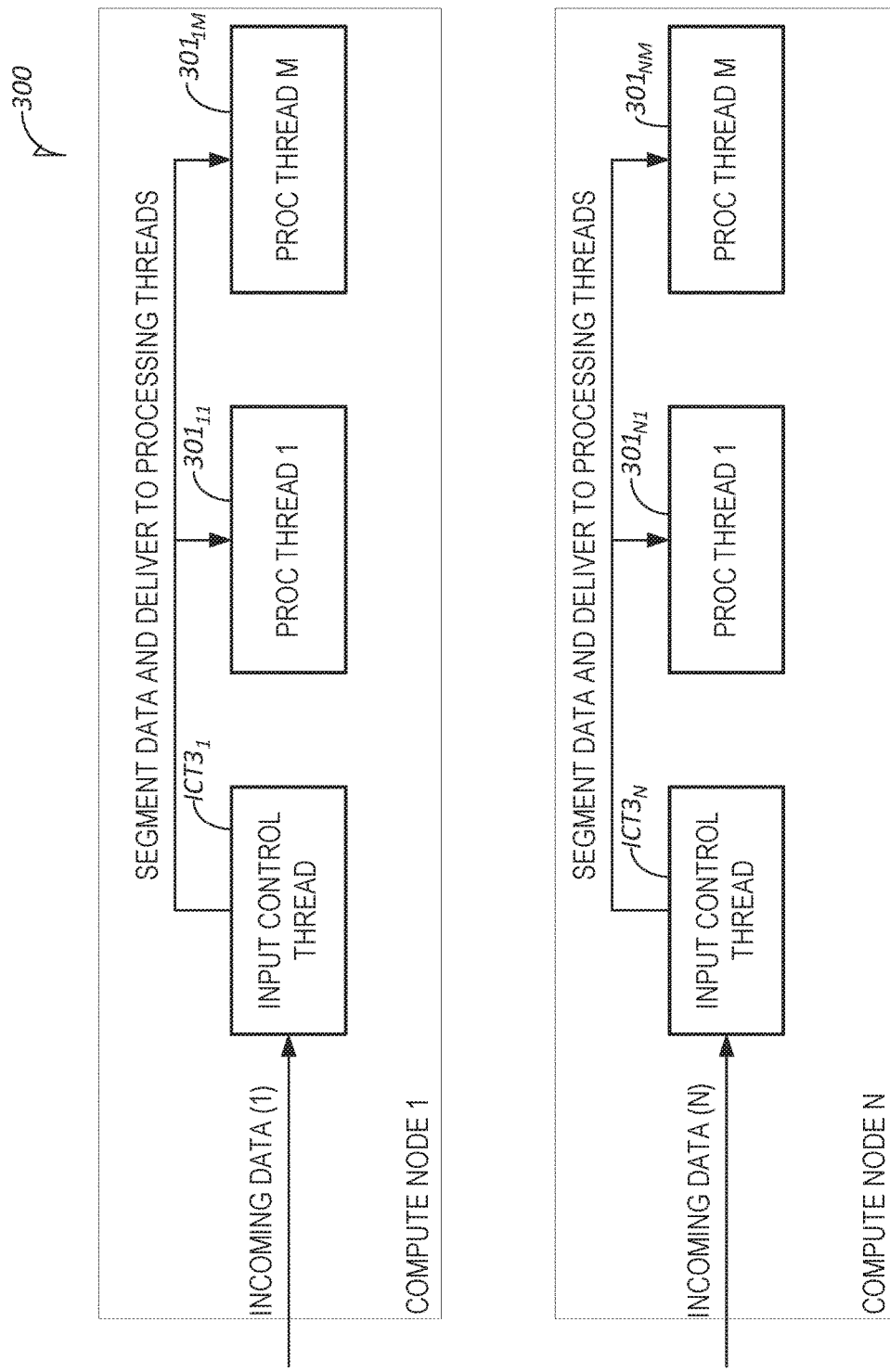
FIG. 3 depicts a more detailed baseline processing system with no fault recovery, according to some embodiments.

A detailed description of fault recovery embodiments in massively parallel computing applications may be seen beginning with respect to FIG. 3. FIG. 3 depicts a more detailed baseline processing system than that described above with respect to FIGS. 1 and 2 and, like the above description of FIGS. 1 and 2, FIG. 3 has no fault recovery depicted. FIG. 3 shows an M×N processing array 300, where M is the number of threads per node and N is the number of computing nodes. In this configuration, there are N independent incoming data streams, which may be illustrated as Incoming Data (1) . . . Incoming Data N, and which also may be referred to herein as incoming data channels or input data. Each one of those data streams may be broken by, in some embodiments, input control thread $ICT3_1$, which segments the Incoming Data Stream (1) of Compute Node 1 into M smaller data streams and delivers the segmented data to processing threads such as Processing Thread $301_{11}$ . . . Processing Thread $301_{1M}$ of Compute Node 1. Input Control Thread $ICT3_N$ may perform the same function for Incoming Data Stream (N) in Compute Node N. In a real time radar processor, there might be N beams (of data streams) and M subswaths, where "subswath" means a portion of the range extent of a radar beam. All N data streams are streaming into the computing system simultaneously or concurrently. For each processing interval, there may be data for all N compute nodes. For example, at t=0, there are N pieces of data; at t=1, there are N more pieces of data; at t=2, there are N more pieces of data, and so on. At each one of these t=0, 1, 2 processing intervals, the processing steps denoted in FIG. 1 will usually occur. Namely, at t=0, the FIG. 1 processing steps occurring at t1, t2, and t3 must occur. Then at t=1, the FIG. 1 processing steps occurring at t1, t2, and t3 may occur again, and so on. It will be understood by those of ordinary skill in the art that "processing steps occurring at t1, t2 and t3" mean process steps 1, 3, 5 at t1, share steps 7, 9, 11 at t2 and process steps 13, 15, 17 at t3.

Figure 4:
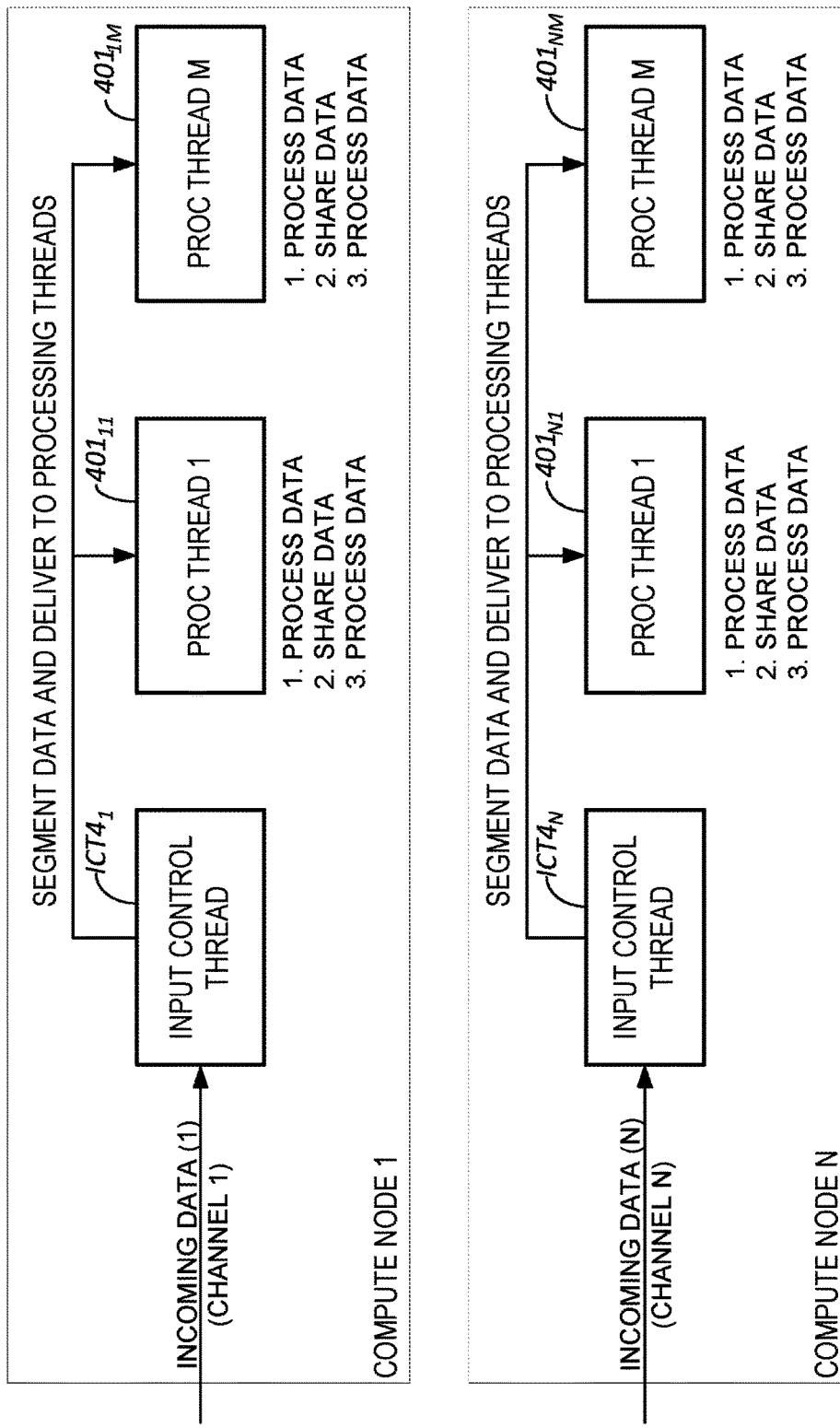
FIG. 4 depicts processing threads of FIG. 3 with required communication for algorithms illustrated in additional detail, according to some embodiments.

The processing threads illustrated in FIG. 3 perform signal processing algorithms (or perhaps image processing algorithms, depending on the application). Often times these algorithms are broken up into multiple steps. Some steps may only depend on the "local" data in that compute node, but other steps may need "non-local" data from other compute nodes. This is shown in FIG. 4 FIG. 4 depicts processing threads of FIG. 3, noted as $ICT3_1, \ldots, ICT3_N$ with required communication for algorithms illustrated in additional detail, according to some embodiments. Although the components of FIG. 4 are the same as those of FIG. 3, they bear the reference numeral "4" for consistency with the figure number. Also, the algorithms involve communication steps (i.e. "share data" such as in the Process Data, Share Data, Process Data steps illustrated for Compute Node 1 and Compute Node N) where data is shared non-locally between and among processing threads $401_{11}$ of Compute Node 1 . . . $401_{1M}$ of compute node 1, and between and among processing threads $401N_{N1}$ . . . $401_{NM}$ of Compute Node N. This is illustrated by "1. Process Data, 2. Share Data, 3. Process Data" at the process threads of FIG. 4. These communication steps are often vital parts of the algorithm, and more importantly, they are vital parts to the synchronization of the system. If one compute node does not receive data at the right time, the communications between nodes will fail because one node (or maybe more nodes) won't attempt to participate in the communication. More specifically—they will take too long, and this can be fatal in a real time system. So if the "incoming data" is either a) coming over an unreliable connection, or b) the data provider is unreliable, then this baseline system is vulnerable to fatal error conditions (communications timeouts). This can cause input buffer overflow.

Figure 5:
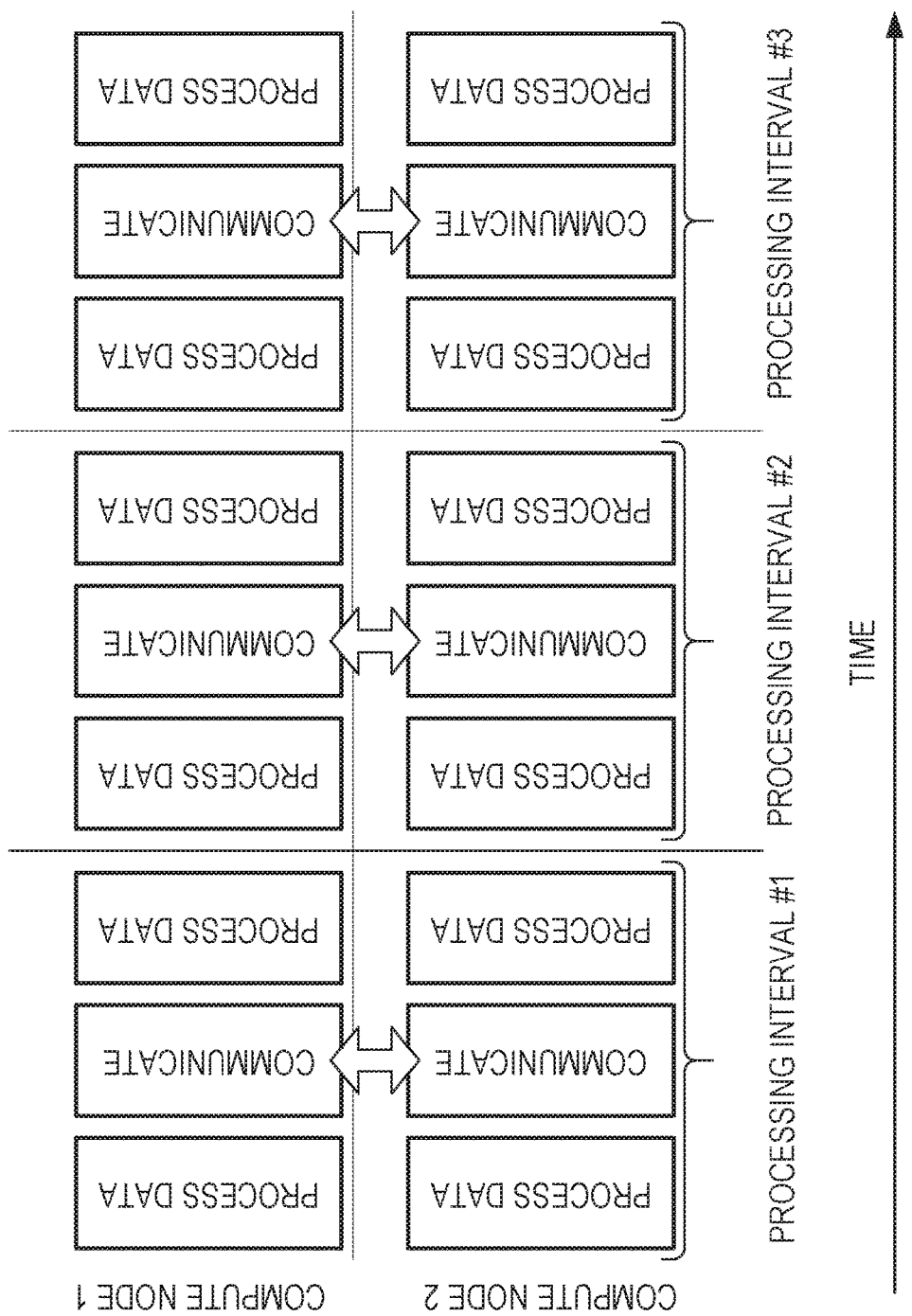
FIG. 5 depicts a sample processing timeline similar to FIG. 1 but with additional description of a sample processing timeline, according to some embodiments.

FIG. 5 depicts a sample processing timeline comprising three processing intervals, Processing Interval #1, Processing Interval #2, and Processing Interval #3 for two compute nodes, Compute Node 1 and Compute Node 2. FIG. 5 is similar to FIG. 1 where the Communicate blocks in FIG. 5 correspond to the Share blocks in FIG. 1, and with additional description of the sample processing timeline, according to some embodiments. FIG. 5 might be considered a typical processing timeline. In this processing timeline, there is a specific window of time in which all nodes that are scheduled to participate in a communication must participate in the communication. Three windows of time are shown, Processing Interval #1, Processing Interval #2, and Processing Interval #3. If one node does not receive data, the compute nodes would fail to meet their timeline due to communication timeouts.

Figure 6:
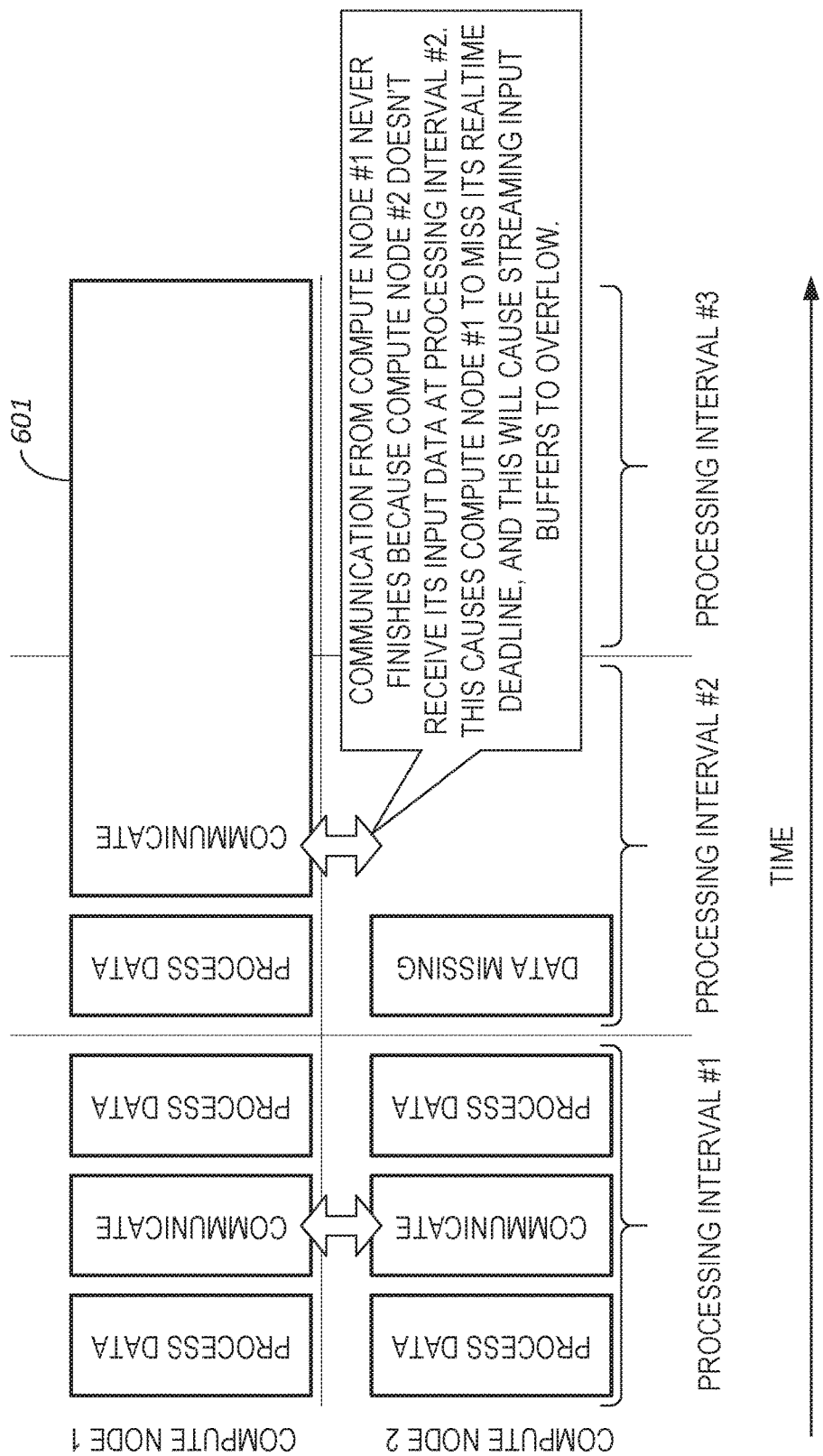
FIG. 6 depicts the timeline of FIG. 5 but with real-time deadlines for receiving node input data and illustrates consequences if one node does not receive input data, according to some embodiments.

FIG. 6 depicts the timeline of FIG. 5 but with real-time deadlines for receiving node input data and illustrates consequences if one node does not receive input data, according to some embodiments. In FIG. 6. Processing Node 2 does not receive its input data for Processing Interval #2, as indicated by Process Data Missing. If Processing Node #2 does not receive its input data that is required during Processing Interval #2, as seen at the elongated Communicate block 601, then communication from Processing Node #1 never finishes. This causes Processing Node #1 to miss its real time deadline, and this will cause streaming input buffers to overflow. One can try to prevent this error by putting a fixed timeout on the communication, but if too many failures occur consecutively, the compute nodes will still miss their real time deadlines because the timeouts will accumulate over time. An improved way to prevent the accumulation is to set the communication timeout to be equal to the slack time in the processing interval. However, in the figures above, there is little to no slack time available to use because the full time interval is used up by the algorithm processing (two steps of processing and one step of communication in this example as illustrated in FIGS. 1, 4 and 5). An Event Manager, discussed in detail below, prevents timeouts from being necessary by ensuring that every compute node will participate in the processing and communications . . . even if that node didn't receive any input data from its input data source.

Event Manager Description

Figure 7:
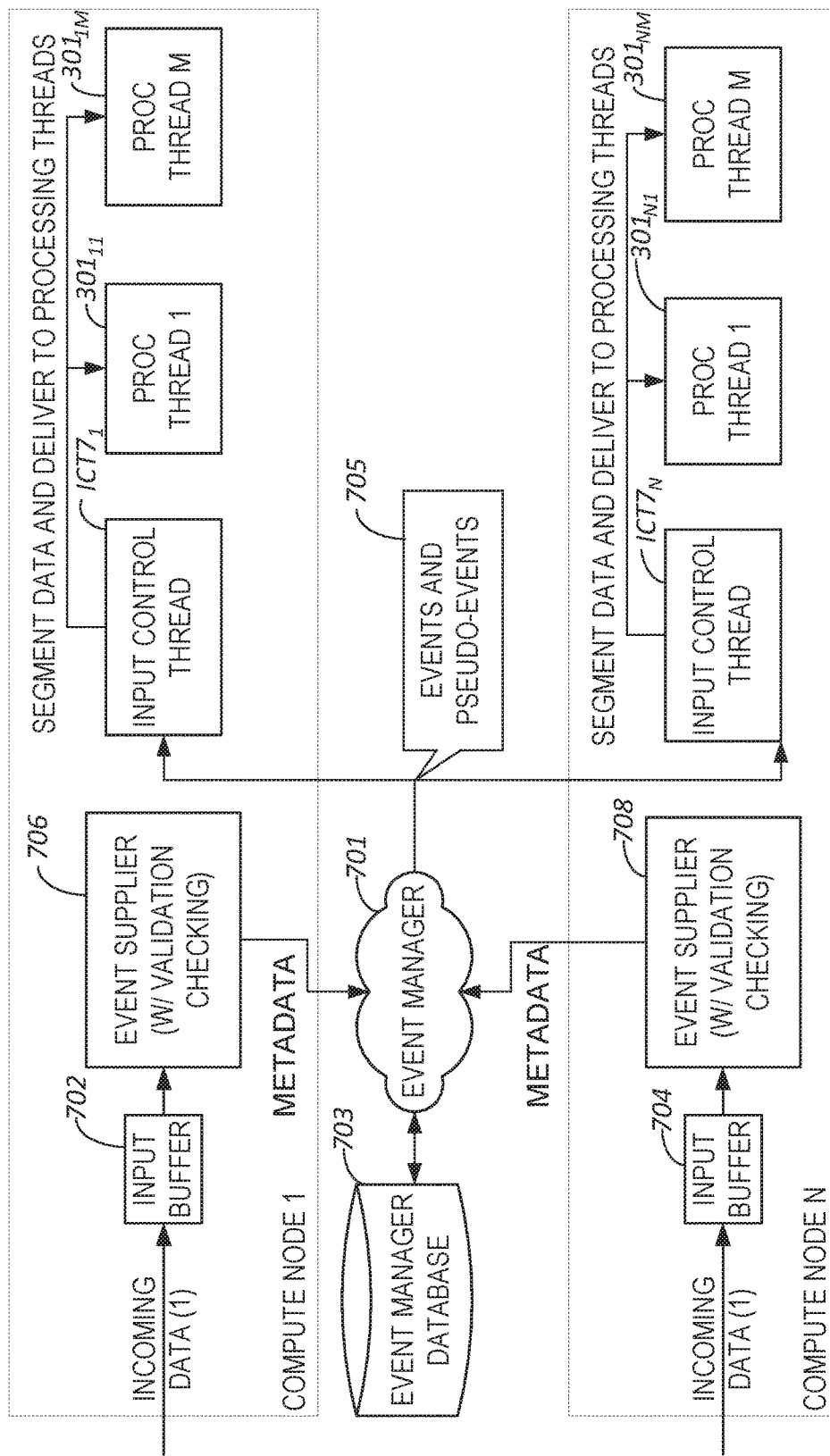
FIG. 7 depicts an Event Manager placed at the beginning of a processing pipeline, according to some embodiments.

FIG. 7 depicts the processing threads of FIG. 3 with an Event Manager 701 placed conceptually at the beginning of a processing pipeline, according to some embodiments. The reference numerals seen on FIG. 3 are reproduced on FIG. 7 for ease of reference, but with a leading "7" reference numeral for consistency with the figure (FIG. 7). The Event Manager 701 is conceptually placed before the algorithm processing pipeline. Compute Nodes 1 . . . N forward metadata about each incoming event to the Event Manager 701. Event Manager 701 collects those events and organizes them in the Event Manager Database 703 (described later). Each compute node has incoming data streams. For example, Compute Nodes 1 is shown as having only one incoming data stream such as INCOMING DATA (1), one input buffer, such as at 702, one Event Supplier such as at 706, one input control thread as $ICT7_1$ and processing threads such as at $701_{11}$, $701_{1M}$ for ease of illustration. Input Control Thread $ICT7_1$ has the same function as $ICT3_1$, explained above with respect to FIG. 3. The function of the Event Supplier is to perform initial checks on the incoming metadata from the input data channels and to forward the status of these checks to the global Event Manager. Checking may include consistency checking within input data channels, such as checking whether each input data channel identifier is correct, if the time of arrival is consistent with expected time of arrival and the like. In practice each compute node may have more than one input data stream, each with its own input buffer and processing threads. In the general case, the set of N compute nodes would have j input buffers, and j sets of M processing threads, where j is $\geq$N. In some embodiments, there would be only one Event Supplier and one Input Control Thread per compute node regardless of the number j input buffers and j sets of M processing threads for that compute node. Once all the computing nodes' events arrive for a given processing interval, the Event Manager compares the metadata about each event to the metadata about all the other events in the processing interval. If the metadata matches sufficiently well, the events are forwarded to the compute nodes as "regular" events. If the events' metadata for a processing interval does not match each other well, the Event Manager usually decides which events are the "correct" events and which events are "incorrect," although in some embodiments the Event Supplier, such as 706, 708 of FIG. 7, may make that decision or, in other embodiments, yet another component might make that decision, as may be designed by the system designer. Then the "correct" events are forwarded to the compute nodes as regular events, and the "incorrect" events are combined with the "correct" metadata and sent back to the compute nodes. Then the compute nodes will know they received corrupted data, and they will have enough metadata about the "correct" events to supplement or modify their incoming data to match the other nodes' expectations. For example, in a video imaging application, the metadata from the "correct" events might indicate that 10 frames worth of video data should have been received. The metadata would also provide the timestamps for those 10 frames, and the Euler pointing angles for those 10 frames. The nodes that received corrupt or missing data would receive pseudo-events and the system designer may decide to have the system utilize that simple metadata (number of frames, timestamps, and Euler pointing angles) to generate enough fake data (i.e. a pseudo-event) as a way of "blanking out" (discussed further below) to satisfy the normal processing flow required for the downstream communications to succeed.

Correct and Incorrect Events

Events are labeled "correct" when metadata from all the compute nodes matches sufficiently well. As used in this context, the term "sufficiently well" will be application dependent. In the application described herein, it means that all the events from all the compute nodes meet the following basic conditions:
1. They correspond to the same processing interval.
2. The amount of data is the same across all the compute nodes.

The Event Manager will generate "incorrect" events for a given compute node if that compute node supplied metadata about an event but it does not sufficiently match the other nodes' data. So for a given processing interval, it is possible that many nodes will get "correct" events and a few nodes will get events marked as "incorrect" events. The nodes that get "incorrect" events will know that their data has been corrupted and does not sufficiently match the other nodes sufficiently well (i.e. it fails one of the two checks listed above).

But how does the Event Manager know which ones are correct and which ones are incorrect? The Event Manager uses a simplified, fast histogram method to track key parameters of the metadata. As new metadata arrives, the key fields of the metadata are added to ongoing histograms that are accumulating for each processing time slot. Normal histogram methods would require the Event Manager to sort and group the data with like elements, and that can be expensive in a real time system. However, the simplified, fast-histogram utilized in the Event Manager does not require anything of the sort. Instead, the following data structure is updated (for each key parameter of the metadata), where what constitutes a key parameter may be determined by the system designer:

Fast Histogram Data Structure
   nUniq//Number of unique elements (nUniq)
   elem[1 . . . nUniq]//Array of unique elements.
   counts[1 . . . nUniq]//Array of counts of each unique element As an example of the above, in nUniq, the number of unique elements would be the number of unique elements in the metadata, for example, the number of unique time stamps. This number would be entered for each type of element in the meta data, such as number of events, Euler pointing angle, number of video frames, and the like. Unique elements may be located in the headers of the data. To illustrate the fast histogram data structure in some embodiments, if there are 4 input channels, and the data from the 4 input channels has time stamps "10, 10, 10, and 15", then there are two unique elements: 10 and 15, and the array of unique elements, the elem[ ] array, would have two entries, namely "10" and "15." The counts[ ] array would have two entries: 3 and 1. That means there would be 3 of the 10's and 1 of the 15's. In the illustration under discussion, however, the "15" is out of place so the Event Manager 701 will detect this and generate a pseudo-event as discussed in more detail below. For now, the generation of a pseudo-event in this example comprises the Event Manager detecting that the timestamp "15" is out of place and a) generating a pseudo-event for the channel that gave headers+data corresponding to t=15, and b) "slide the event to the right" in the database. In other words, the Event Manager in this example holds on to the event at t=15, because the other 3 input channels (which in this example are at a time of "10") are likely to provide events at t=15 very soon, and the Event Manager needs to pass those events to the downstream processing algorithm at the right time.

Updating this structure with a new data point, where "data point" means the event data for the processing interval under discussion, is very quick; The system can linearly search through the elem[ ] array to see if the data point's value already exists in the Fast Histogram. If it does exist (and it likely will exist in the very first slot in this example), then the corresponding element in the count[ ] array is incremented. This is a very efficient way of allowing the incoming data to "vote" which data is correct and identify which data is incorrect without relying on any single data stream being completely correct.

Pseudo Events

As event metadata is placed in the Event Manager Database, it is timestamped. If "enough time" passes after the first event is received for a processing interval and some nodes have not reported events for their corresponding processing interval, the Event Manager will send out pseudo-events, illustrated below, to the child computing nodes that missed their data. The term "enough time" is application dependent. In other words, in some embodiments there may be multiple data streams and multiple processing algorithms, each of which may have its own processing interval time and its own time-out. Because of this variability of latency through N data streams. "enough time" depends on the application involved. Also, as used in this context, "child computing node" means an individual processing thread such as those illustrated in FIGS. 3, 4 and 7.

A pseudo-event may be viewed as a regular event except it is tagged as a "pseudo-event" instead of a "regular" event. For example, one of the attributes of an "event" is the "event type" which is metadata created by the Event Manager. Possible values of the "event type" created by the Event Manager are "regular". "received data is bad data", or "no data received". Events tagged by the Event Manager with an indication of correctness, such as "regular," are correct events. Events that are not considered correct are tagged to identify irregularity, such as, in some embodiments, "received data is bad" or "no data received," which are pseudo-events.

This will allow the otherwise-ignorant child computing nodes to participate in the algorithm processing and communications even though they received no input data. Consequently, all the downstream communications occur without timeouts or deadlocks. Again, no single data stream needs to be completely correct, and furthermore, the Event Manager 701 does NOT need to make any assumptions about the periodicity of the data. In other words, Event Manager 701 does not need to assume that it should receive data once per second, for example. Instead. Event Manager 701 only starts the data arrival watchdog timer timeout once a single node reports events for a given processing interval. This is required for an event driven system that is not necessarily periodic. If no node reports events, which would be an abnormal event such as all nodes being paused for some reason, then no data arrives and no data arrival watchdog timeouts are generated, and this is the desired behavior for the situation where (for whatever reason) no node reports events. On the other hand, if a scheduled data arrival from any input data stream times out, then a problem has occurred and a pseudo-even for that input data stream is generated and transmitted downstream as discussed further below.

Given that every node has input data at the end of a time period (either correct data or pseudo-event data), the nodes are allowed to continue processing without missing real-time deadlines, overflowing buffers or causing deadlocks. But if pseudo-event data is forwarded to a node, the output of the processing of that node has to be erroneous. In some embodiments, such erroneous data can be "zeroed out." (making all zeros) or a similar value that does not add additional error. The act of "zeroing out" the data is the least wrong thing to do. Consequently, although pseudo-events introduce errors, such errors are the most benign errors. To explain this by analogy, "zeroing out" the data is somewhat similar to pretending like a radar control system just missed scanning a particular area. So, (in terms of a video camera analogy), zeroing out the data for one instance of time is like inserting a blank frame of video in a video stream, where "blank" indicates all zeros in some embodiments, but can indicate any code that the designer chooses to indicate to the system that a blank frame has been inserted. The result of a blank frame is that the video is technically erroneous, but it is generally an acceptable error. The alternative (operating without the Event Manager) would be, in the video camera analogy, is like turning off the video camera whenever there was an error in the data.

Event Manager Algorithms

The algorithm for assigning events to unique processing intervals in the Event Manager Database is non-trivial. The Event Manager Database has a fixed number of processing interval time slots. If the time between events was large enough and the pseudo-event timeout was small enough, there would only need to be one slot in the database. For example, if the time between events were one second (i.e., the Processing Intervals of FIG. 7 were one second) and the pseudo-event timeout was set to 0.1 seconds, then only one time slot could be in use at a time. Stated another way, there would not be any time skew in the data. But some systems do have non-trivial time skews in the data.

Figure 8:
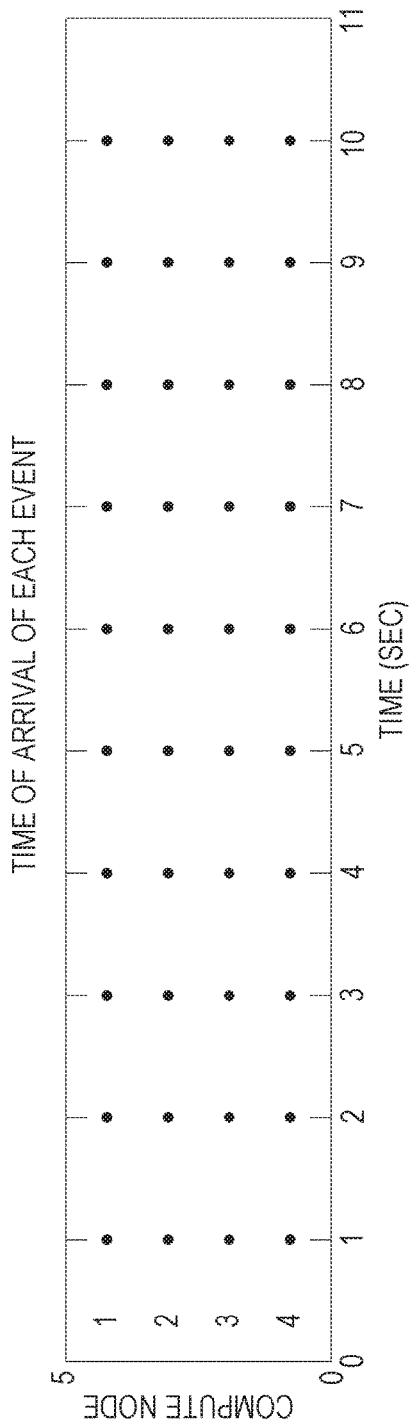
FIG. 8 depicts a scatter plot of some of the times of the events for each compute mode, according to some embodiments.

FIG. 8 depicts a scatter plot of some of the times of the events for each compute mode, according to some embodiments. In FIG. 8 the processing interval is one second. In FIG. 8 there is no time skew in the data, the compute nodes all receive data at the same time, and it would be relatively easy to determine which event corresponds to which processing interval. Imagining this ideal scenario, the time of the events is plotted in a scatter plot as in the FIG. 8, with N=4. In other words, there are four channels, 1, 2, 3, and 4 in the drawing. The dots indicate the data arrival time in Processing Intervals 1 through 10.

Figure 9:
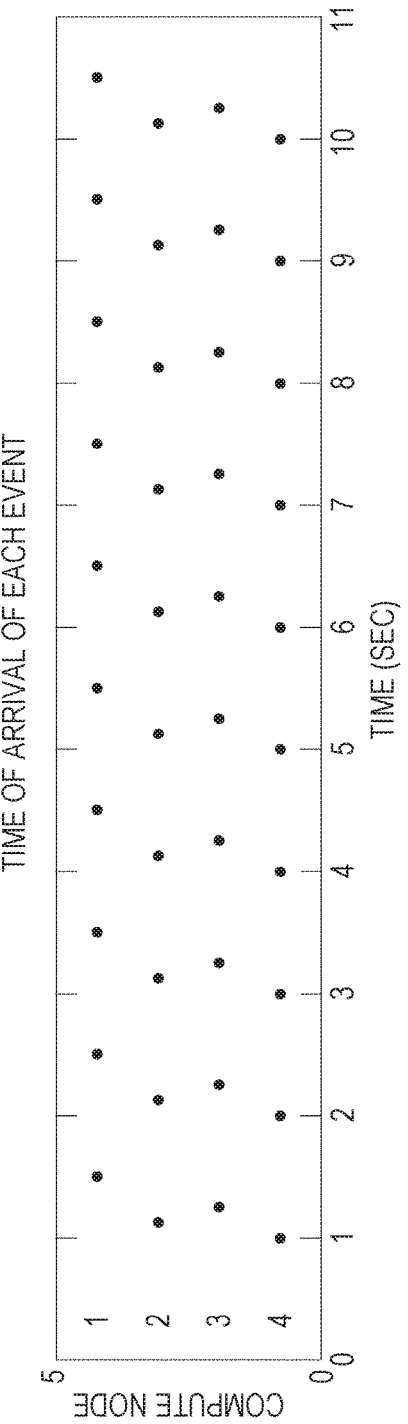
FIG. 9 depicts scatter plots of some of the times of the events for each compute node, in the presence of time skew across the compute nodes, according to some embodiments.

In cases where the data arrival watchdog timeout is very small and the processing interval is very long, there would generally be almost no concern about skewed data arrival time overlap. However, FIG. 9 depicts a situation that may occur when the watchdog timeout is not very small with respect to the processing interval. Namely. FIG. 9 depicts scatter plots of some of the times of the events for each compute node, in the presence of time skew across the compute nodes, according to some embodiments. In FIG. 9 there is time skew in the data (e.g., variance in the arrival time of the event for each compute node). In FIG. 9 it is still relatively easy to discern which event corresponds to which processing interval, but one can imagine it being worse if the processing intervals start to become smaller and/or the necessary timeouts become longer. And of course, the problem is made more difficult by the fact that some events might be missing! So the problem of assigning incoming compute node events to slots in the database is non-trivial. No assumptions can be made about each processing interval at the beginning of the processing interval. In other words, the Event Manager cannot assume that the first event for a given processing interval is correct, so the assignment between incoming events and processing intervals are somewhat malleable. Stated another way, if the Event Manager initially decides that an event corresponds to processing interval T, it may receive data from other compute nodes that makes the Event Manager "change its mind" and reassign the event in question to processing interval T+1. That can easily happen when the event for computing node N, processing interval T, is dropped for some reason. Therefore, the Event Manager must be able to "slide" all the events for a given computing node "to the right". In other words, event E1 may currently be assigned to processing interval T and it must be moved to processing interval T+1 ("slid right"); event E2 may currently be assigned to processing interval T+1 and it must be moved to processing interval T+2, and so on. This "sliding" occurs when the Event Manager does final processing on a single processing interval right before it sends out events and pseudo-events to the computing nodes. This "final processing" can be triggered by a) a timeout or b) when a "full" (meaning no longer "open") processing interval time slot is detected.

Event Assignment Algorithm

More specifically, the basic algorithm to assign incoming events to slots in the Event Manager Database can be seen as follows, with reference to FIG. 10. FIG. 10 depicts diagrammatically the Event Manager database as a two-dimensional metadata array, according to some embodiments. A first step is discussed next below.

Create a two dimensional (2D) metadata array called metadataDB, sized N×T, where N is the number of j input data channels and T is the number of processing interval time slots needed to support the application (e.g., T is the number of "open" time slots for a given timeout interval and processing interval). This is not to be confused with FIGS. 3, 4 and 7-9 where N was used merely for numbering the compute nodes for those examples.

The 2D array may be seen in FIG. 10 wherein the Event Manager collects events into a 2D array, or table, with N rows and T columns. The "row" in the array is the input channel index, shown as Channel 1 through Channel N in FIG. 4. In one embodiment, there may be channel indexes 1 through 4 if there are 4 input channels. This can be seen by the reference numeral at the head of each row, namely 1, 2, 3, and 4 using a one-based numbering system. The "Column" in the 2D array is the time slot index (and is seen as columns 0, 1, 2, 3, and 4, using a zero-based numbering system). In operation, column 4 would wrap-around to column 0 when column 4 fills up in the filling process. The number T of time slots in any given 2D array can be explained by the following example. If the regular rate at which the Event Manager opens/closes time slots is 1 second (as shown in FIG. 6), but the timeout threshold is 1.5 seconds, that means that at any given time, there could be approximately two open time slots (ceil(1.5/1)). In other words, the "ceiling" of open time slots needed if the ratio of timeout threshold to time slot time period is 1.5/1 is 2 since the number of open time slots needs to be "rounded up" to accommodate the ratio. As another example, even a ratio of timeout threshold to time slot time period were 1.01/1, there would still be a need for 2 open timeslots, rounded up to accommodate the ratio. (If all the data were arriving promptly, there would be only one open time slot at a time, but under an example case where one input channel is dead, meaning it has stopped filling its input buffer, for whatever reason, the Event Manager will be constantly "timing out", and so there would be either 1 or 2 open slots at any given time.) In FIG. 10, the number of open time slots T could have been selected as 2. However, for ease of illustrations 5 timeslots were selected, namely 0, 1, 2, 3, and 4.

Generally, a time slot (a column in the example of FIG. 10) is "open" if it has received at least 1 event notification (metadata) but not all event notifications in the column. In the 2D array of FIG. 10, for an embodiment with N=4 input data channels), column 0 is open because it has one or more 3 event notifications. Technically, as illustrated in FIG. 10, column 0 is only instantaneously open with all 4 event notifications, and is about to be purged, meaning it is about to pass the 4 illustrated event notifications to the appropriate downstream processing algorithms, at which point it will be closed and ready for use again, waiting to become "open" when the next event notification arrives. Column 1 is open because it has 2 metadata quantities and is waiting for two additional event notifications at row/column 1,1 and row column 4.4, at which point it will be at the point at which it will become closed as explained next above with respect to column 0. As to next time slot positions in FIG. 10, row/column position 1,1 is the next time slot for input data channel 1; row/column 2,2 is the next time slot for input data channel 2; row/column 3,2 is the next time slot for input data channel 3; and row/column 4,1 is the next time slot for input data channel 4.

Under normal operation (the condition in which there are no errors), the Event Manager database of FIG. 10 would receive events from the four input channels nearly simultaneously, and all 4 input data channels would have the exact same time stamp, for example, t=10. Once the Event Manager receives all four event notification (and it knows it is only expecting four), the Event Manager sends the event notifications to the downstream algorithms and "closes out" or purges that column such that it is empty and ready to become "open." So, an "open" time slot is a time slot that has anywhere from 1 to (the number of input channels −1 ("NumInputChannels−1")) events in it (although, as discussed above, a time slot will have a full column of events instantaneously and is still "open" until it is purged. If a time slot, having been purged, has zero events in it, then that time slot is "closed," and is not yet open until arrival of the next event notification. Once the Event Manager receives all the event notifications for a given time slot, as mentioned above in this paragraph, it sends them to the downstream algorithm, and deletes them from the Event Manager database (i.e., the Event Manager database 1000). Continuing with the above algorithm, where:

nextSlot[ ] is a full array of all N next time slots;
nextSlot[n] is the next time slot, where n=1, 2, 3, 4;
metadataDB is the N×T metadata database; and
metadataDB[n][t] is the elements for a row N and column T:

Create and initialize a nextSlot[ ] array of size N. Initialize all values to 0
Loop while awaiting metadata for an event
Receive the metadata for an event from an input data channel of compute node "n" where n=1, 2, . . . N
Save the received metadata into metadataDB[n][nextSlot[n]]
nextSlot[n]=nextSlot[n]+1 (update)
if nextSlot[n]>=T, nextSlot[n]=0 (wrap-around where T=maximum number of open slots)
Loop over the metadataDB to see if there are any time slots that now have metadata for all compute nodes
If so, this might be a "finished" time slot
Before sending out events, check to see if all events in this time slot have the same metadata time, or within a given tolerance thereof. As used herein. "metadata time" means the event time stamp that indicates when the data was collected. In the above camera analogy that time would be essentially when the shutter opens.

If one or more nodes has metadata time PASSED the other nodes' metadata times, then that means one or more processing intervals were dropped by an incoming data stream.

Slide the data in metadataDB[n][ ] (where the [ ] means all open time slots that have metadata in them) to the right by one time slot, thereby delaying the processing of that node's metadata entry.

Since the data is "slid right" by one time slot, there is now an empty metadata entry in this time slot. This means a pseudo-event will need to be sent out instead of a regular event.

Send out all the events and label them as "correct" (i.e., an event notification) or "incorrect" (i.e., a pseudo-event notification) as appropriate.

Loop over the metadataDB to see if there are any open time slots that have "timed out" because not all compute nodes have reported data for that time slot.

If any have timed out, then send out both events and pseudo-events to the compute nodes, while doing the same "slide right" conditional "if" checking described above.

Return to top of loop (i.e., the above Loop while awaiting metadata for an event).

The Event Manager and the Event Manager Database, as described above, are a fault-tolerance mechanism that allows a massively parallel computing system to be tolerant to both corrupted input data and missing input data. Without this Event Manager, the downstream processing system would be hampered by irrecoverable errors (buffer overflows, missed real time deadlines, and/or deadlocks) if some of the input data were corrupted or missing. But with this system and method in place, the parallel computing system in which it resides can be made robust against these input data errors, thereby allowing processing to continue even in the presence of input errors.

Figure 11:
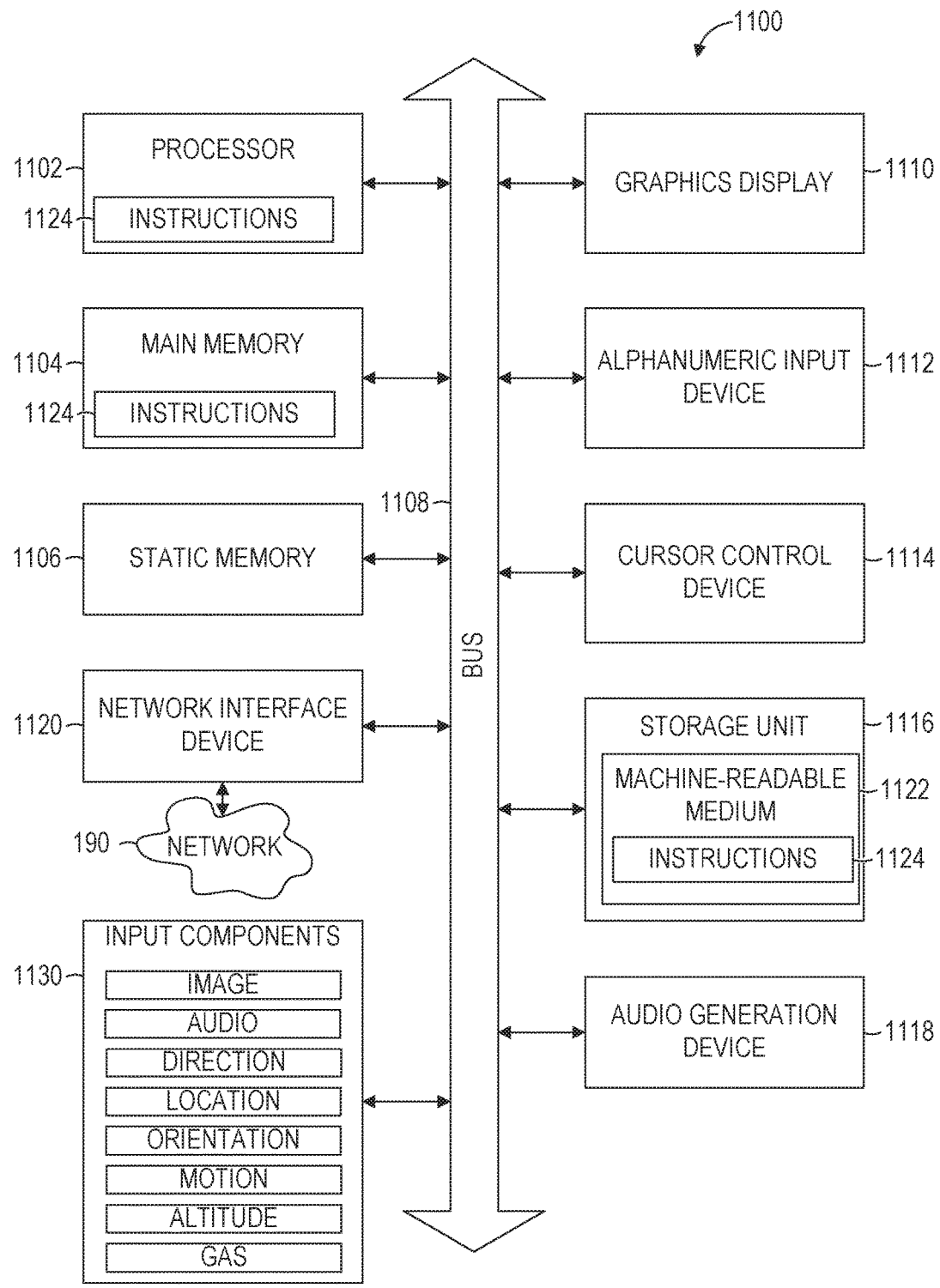
FIG. 11 depicts is a block diagram illustrating components of a machine, according to some example embodiments, able to read instructions from a machine-readable medium and perform any one or more of the methodologies discussed herein.

FIG. 11 depicts is a block diagram illustrating components of a machine, according to some example embodiments, able to read instructions from a machine-readable medium and perform any one or more of the methodologies discussed herein. The components of a machine 1100, according to some example embodiments, are able to read instructions 1124 from a machine-readable medium 1122 (sometimes referred to as a non-transitory machine-readable medium, a machine-readable storage medium, a computer-readable storage medium, a machine-readable hardware storage device, or any suitable combination thereof) and perform any one or more of the methodologies discussed herein, in whole or in part. Specifically. FIG. 11 shows the machine 1100 in the example form of a computer system (e.g., a computer) within which the instructions 1124 (e.g., software, a program, an application, an applet, an app, or other executable code) for causing the machine 1100 to perform any one or more of the methodologies discussed herein may be executed, in whole or in part.

In alternative embodiments, the machine 1100 operates as a standalone device or may be connected (e.g., networked) to other machines. In a networked deployment, the machine 1100 may operate in the capacity of a server machine or a client machine in a server-client network environment, or as a peer machine in a distributed (e.g., peer-to-peer) network environment. The machine 1100 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1124, sequentially or otherwise, that specify actions to be taken by that machine. Further, while only a single machine is illustrated, the term "machine" shall also be taken to include any collection of machines that individually or jointly execute the instructions 1124 to perform all or part of any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The processor 1102 may contain microcircuits that are configurable, temporarily or permanently, by some or all of the instructions 1124 such that the processor 1102 is configurable to perform any one or more of the methodologies described herein, in whole or in part. For example, a set of one or more microcircuits of the processor 1102 may be configurable to execute one or more modules (e.g., software modules) described herein.

The machine 1100 may further include a graphics display 1110 (e.g., a plasma display panel (PDP), a light emitting diode (LED) display, a liquid crystal display (LCD), a projector, a cathode ray tube (CRT), or any other display capable of displaying graphics or video). The machine 1100 may also include an alphanumeric input device 1112 (e.g., a keyboard or keypad), a cursor control device 1114 (e.g., a mouse, a touchpad, a trackball, a joystick, a motion sensor, an eye tracking device, or other pointing instrument), a storage unit 1116, an audio generation device 1118 (e.g., a sound card, an amplifier, a speaker, a headphone jack, or any suitable combination thereof), and a network interface device 1120.

The storage unit 1116 includes the machine-readable medium 1122 (e.g., a tangible and non-transitory machine-readable storage medium) on which are stored the instructions 1124 embodying any one or more of the methodologies or functions described herein. The instructions 1124 may also reside, completely or at least partially, within the main memory 1104, within the processor 1102 (e.g., within the processor's cache memory), or both, before or during execution thereof by the machine 1100. Accordingly, the main memory 1104 and the processor 1102 may be considered machine-readable media (e.g., tangible and non-transitory machine-readable media). The instructions 1124 may be transmitted or received over the network 190 via the network interface device 1120. For example, the network interface device 1120 may communicate the instructions 1124 using any one or more transfer protocols (e.g., hypertext transfer protocol (HTTP)).

In some example embodiments, the machine 1100 may be a portable computing device, such as a smart phone or tablet computer, and have one or more additional input components 1130 (e.g., sensors or gauges). Examples of such input components 1130 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1124 for execution by the machine 1100, such that the instructions 1124, when executed by one or more processors of the machine 1100 (e.g., processor 1102), cause the machine 1100 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Various embodiments may be a system, a method, and/or a computer program product. The computer program product may include a machine-readable storage medium (or media) having machine-readable program instructions thereon for causing a processor to carry out aspects described herein.

The machine-readable storage medium, sometimes referred to as a machine-readable hardware storage device, which stores signals, but it not the signal itself, can be a tangible device that can retain and store instructions for use by an instruction execution device. A machine-readable hardware storage device may also store data. The machine-readable hardware storage device may be, for example, but is not limited to, an electronic storage device, a magnetic storage device, an optical storage device, an electromagnetic storage device, a semiconductor storage device, or any suitable combination of the foregoing. A non-exhaustive list of more specific examples of the machine-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A machine-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Machine-readable program instructions described herein can be downloaded to respective computing/processing devices from a machine-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives machine-readable program instructions from the network and forwards the machine-readable program instructions for storage in a machine-readable storage medium within the respective computing/processing device.

Machine-readable program instructions for carrying out operations described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk. C++ or the like, and conventional procedural programming languages, such as the "C" programming language or similar programming languages. The machine-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field programmable gate arrays (FPGA), or programmable logic arrays (PLA) may execute the machine-readable program instructions by utilizing state information of the machine-readable program instructions to personalize the electronic circuitry, in order to perform aspects disclosed herein.

Aspects of the present disclosure are described herein with reference to flowchart illustrations and/or block diagrams of methods, apparatus (systems), and computer program products according to some embodiments. It will be understood that each block of the flowchart illustrations and/or block diagrams, and combinations of blocks in the flowchart illustrations and/or block diagrams, can be implemented by machine-readable program instructions.

These machine-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These machine-readable program instructions may also be stored in a machine-readable storage medium that can direct a computer, a programmable data processing apparatus, and/or other devices to function in a particular manner, such that the machine-readable storage medium having instructions stored therein comprises an article of manufacture including instructions which implement aspects of the function/act specified in the flowchart and/or block diagram block or blocks.

The machine-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of preventing buffer overflow resulting from data faults in a parallel computing system, comprising:

creating a two dimensional (2D) array space in computer storage, the 2D array space configured to store event notifications received from j respective input data streams via one or more input buffers in N compute nodes, where j≥N, during T processing interval time slots, wherein the T time slots have incrementable values from a first value to a $T^{th}$ value, wherein the event notifications comprise metadata including at least a timestamp, wherein arrival of a first event notification causes initiation of a timeout count for all j data streams, and wherein T is the maximum number of open time slots for a given timeout count;

creating and initializing to zero in the 2D array space in the computer storage a first data array of next time slots of size T respectively associated with individual ones of the j input data streams;

receiving a first event notification from one of the j input data streams, during a first time slot, and, responsive to receiving the first event notification, beginning a first timeout count for all j input data streams, and saving metadata of the received event notification in the first time slot in the 2D array space in the computer storage;

incrementing the value of the timeslot for the one of the j input data streams by one to arrive at the value of the next time slot and, if the incremented value is equal to or greater than T, setting the value to the value of the first time slot;

determining whether the 2D array space in the computer storage for any one of the T time slots stores metadata from all j input data streams;

responsive to determining that array storage for any one of the T time slots stores metadata from all j input data streams, determining a value of the time stamp for each metadata stored in the 2D array space in the computer storage for the one of the T time slots; and responsive to determining that the value of the time stamp, within a tolerance, for at least one of the j input data streams of the first time slot, is greater than the time stamp for any other of the j input data streams for the first time slot, delaying event notification for the at least one of the j input data streams by at least one time slot, transmitting a pseudo-event notification to a compute algorithm for the at least one of the j input data streams, and transmitting an event notification to respective compute algorithms for the j input data streams other than the at least one of the j input data streams, wherein data overflow of the one or more input buffers is prevented.

2. The method of claim 1 further comprising determining whether any open time slot in the 2D array space has timed out and, responsive to determining that any open time slot has timed out, delaying the event notification for the open time slot that has timed out and transmitting a pseudo-event notification to a compute algorithm for the input data stream associated with the open time slot that has timed out.

3. The method of claim 2 further comprising transmitting event notifications to respective compute algorithms for each of the input data streams associated with open time slots that have not timed out.

4. The method of claim 1 wherein the pseudo-event notification indicates incorrect data has arrived in an input data stream.

5. The method of claim 4 wherein the pseudo-event notification comprises one of blanked-out data or a combination of metadata.

6. The method of claim 1 further comprising receiving a second event notification comprising metadata from any of the j input data streams, during a next time slot, and, responsive to receiving the second event notification, beginning a second timeout count for all j input data streams for the next time slot, and saving the metadata of the received second event notification in the next time slot in the 2D array space.

7. The method of claim 1 wherein the 2D array space is a component of a system comprising N compute nodes, each compute node comprising at least one data input stream, wherein each of the at least one input data stream has associated therewith an input buffer and a plurality of processing threads.

8. The method of claim 1 wherein the pseudo-events and the events are transmitted to the compute algorithms during any time slot before the respective compute algorithms begin processing during a processing interval associated with the any time slot.

9. The method of claim 1 wherein data overflow of at least one of the one or more input buffers is prevented by a pseudo-event notification.

10. One or more computer-readable hardware storage devices having embedded therein a set of instructions which, when executed by one or more processors of a computer, causes the computer to execute operations comprising:

creating a two dimensional (2D) array space in a computer storage, the 2D array space in the computer storage configured to store event notifications received from j respective input data streams via one or more input buffers of N compute nodes, where j≥N, during T processing interval time slots, wherein the T time slots have incrementable values from a first value to a Tth value, wherein the event notifications comprise metadata including at least a timestamp, wherein arrival of a first event notification causes initiation of a timeout count for all j data streams, and wherein T is the maximum number of open time slots for a given timeout count;

creating and initializing to zero in the 2D array space in the computer storage a first data array of size T of next time slots respectively associated with individual ones of the j input data streams;

receiving a first event notification from one of the j input data streams, during a first time slot, and, responsive to receiving the first event notification, beginning a first timeout count for all j input data streams, and saving metadata of the received event notification in the first time slot in the 2D array space in the computer storage;

incrementing the value of the timeslot for the one of the j input data streams by one to arrive at the value of the next time slot and, if the incremented value is equal to or greater than T, setting the value to the value of the first time slot;

determining whether the 2D array space in the computer storage for any one of the T time slots stores metadata from all j input data streams;

responsive to determining that array storage for any one of the T time slots stores metadata from all j input data streams, determining a value of the time stamp for each metadata stored in the 2D array for the one of the T time slots; and responsive to determining that the value of the time stamp, within a tolerance, for at least one of the j input data streams of the first time slot, is greater than the time stamp for any other of the j input data streams for the first time slot, delaying event notification for the at least one of the j input data streams by at least one time slot, transmitting a pseudo-event notification to a compute algorithm for the at least one of the j input data streams, and transmitting an event notification to respective compute algorithms for the j input data streams other than the at least one of the j input data streams, wherein data overflow of the one or more input buffers is prevented.

11. The one or more computer-readable hardware storage devices of claim 10, the operations further comprising determining whether any open time slot in the 2D array space has timed out and, responsive to determining that any open time slot has timed out, delaying the event notification for the open time slot that has timed out and transmitting a pseudo-event notification to a compute algorithm for the input data stream associated with the open time slot that has timed out.

12. The one or more computer-readable hardware storage devices of claim 11, the operations further comprising transmitting event notifications to respective compute algorithms for each of the input data streams associated with open time slots that have not timed out.

13. The one or more computer-readable hardware storage devices of claim 10 wherein the pseudo-event notification indicates that incorrect data has arrived in an input data stream.

14. The one or more computer-readable hardware storage devices of claim 13 wherein the pseudo-event notification comprises one of blanked-out data or a combination of metadata.

15. The one or more computer-readable hardware storage devices of claim 10, the operations further comprising receiving a second event notification comprising metadata from any of the j input data streams, during a next time slot, and, responsive to receiving the second event notification, beginning a second timeout count for all j input data streams for the next time slot, and saving the metadata of the received second event notification in the next time slot in the 2D array space.

16. The one or more computer-readable hardware storage devices of claim 10 wherein the 2D array space is a component of a system comprising N compute nodes, each compute node comprising at least one data input stream, wherein each of the at least one input data stream has associated therewith an input buffer and a plurality of processing threads.

17. The one or more computer-readable hardware storage devices of claim 10 wherein the pseudo-events and the events are transmitted to the compute algorithms during any time slot before the respective compute algorithms begin processing during a processing interval associated with the any time slot.

18. The one or more computer-readable hardware storage devices of claim 10 wherein a overflow of at least one of the one or more input buffers is prevented by a pseudo-event notification.

19. A system for preventing input buffer overflow resulting from data faults in a parallel processing computer, comprising:

computer storage configured to store computer-readable instructions; and one or more computer processor associated with the computer storage and configured to execute at least some of the computer-readable instructions to perform operations comprising:

creating a two dimensional (2D) array space in the computer storage, the 2D array space configured to store event notifications received from j respective input data streams via one or more input buffers of N compute nodes, where j≥N, during T processing interval time slots, wherein the T time slots have incrementable values from a first value to a $T^{th}$ value, wherein the event notifications comprise metadata including at least a timestamp, wherein arrival of a first event notification causes initiation of a timeout count for all j data streams, and wherein T is the maximum number of open time slots for a given timeout count;

creating and initializing to zero in the 2D array space in the computer storage a first data array of next time slots of size T respectively associated with individual ones of the j input data streams;

receiving a first event notification from one of the j input data streams, during a first time slot, and, responsive to receiving the first event notification, beginning a first timeout count for all j input data streams, and saving the metadata of the received event notification in the first time slot in the 2D array space in the computer storage;

incrementing the value of the timeslot for the one of the j input data streams by one, to arrive at the value of the next time slot and, if the incremented value is equal to or greater than T, setting the value to the value of the first time slot;

determining whether the 2D array space in the computer storage for any one of the T time slots stores metadata from all j input data streams;

responsive to determining that the 2D array space in the computer storage for any one of the T time slots stores metadata from all j input data streams, determining a value of a time stamp for each metadata stored in the 2D array space in the computer storage for the one of the T time slots; and responsive to determining that the value of the time stamp, within a tolerance, for at least one of the j input data streams of the first time slot, is greater than the time stamp for any other of the j input data streams for the first time slot, delaying event notification for the at least one of the j input data streams by at least one time slot, transmitting a pseudo-event notification to a compute algorithm for the at least one of the j input data streams, and transmitting an event notification to respective compute algorithms for the j input data streams other than the at least one of the j input data streams, wherein data overflow of the one or more input buffers of each of the N compute nodes is prevented.

20. The system of claim 19, the instructions further comprising determining whether any open time slot in the 2D array space in the computer storage has timed out and, responsive to determining that any open time slot has timed out, delaying the event notification for the open time slot that has timed out and transmitting a pseudo-event notification to a compute algorithm for the input data stream associated with the open time slot that has timed out and transmitting event notifications to respective compute algorithms for each of the input data streams associated with open time slots that have not timed out.

* * * * *

UNITED STATES PATENT AND TRADEMARK OFFICE
CERTIFICATE OF CORRECTION

PATENT NO. : 10,078,559 B2
APPLICATION NO. : 15/166724
DATED : September 18, 2018
INVENTOR(S) : Benjamin M. Howe It is certified that error appears in the above-identified patent and that said Letters Patent is hereby corrected as shown below:

In the Specification

In Column 1, Line 56, delete "embodiments:" and insert --embodiments;-- therefor In Column 4, Line 34, delete "t1-t3," and insert --$t_1$-$t_3$.-- therefor In Column 4, Line 38, delete "t1," and insert --$t_1$,-- therefor In Column 4, Line 41, delete "t2," and insert --$t_2$,-- therefor In Column 4, Line 44, delete "t3," and insert --$t_3$,-- therefor In Column 4, Line 46, delete "(t2)." and insert --($t_2$).-- therefor In Column 4, Line 56, delete "t2," and insert --$t_2$,-- therefor In Column 7, Line 45, delete "t1, t2, and t3" and insert --$t_1$, $t_2$, and $t_3$-- therefor In Column 7, Line 46, delete "t1, t2, and t3" and insert --$t_1$, $t_2$, and $t_3$-- therefor In Column 7, Line 49, delete "t1, t2, and t3"" and insert --$t_1$, $t_2$, and $t_3$"-- therefor In Column 7, Line 49, delete "t1," and insert --$t_1$,-- therefor In Column 7, Line 50, delete "t2" and insert --$t_2$-- therefor In Column 7, Line 50, delete "t3." and insert --$t_3$.-- therefor In Column 7, Line 57, after "FIG. 4", insert --.--

Signed and Sealed this
Nineteenth Day of January, 2021

Andrei Iancu
*Director of the United States Patent and Trademark Office*

CERTIFICATE OF CORRECTION (continued)
U.S. Pat. No. 10,078,559 B2

In Column 8, Line 2, delete "401$N_{N1}$" and insert --401$_{N1}$-- therefor

In Column 8, Line 36, delete "FIG. 6." and insert --FIG. 6,-- therefor

In Column 9, Line 21, after "arrival", insert --,--

In Column 10, Lines 25-26, delete "fast-histogram" and insert --fast histogram-- therefor In Column 10, Line 33, delete "elements." and insert --elements,-- therefor In Column 11, Line 22, delete "streams." and insert --streams,-- therefor In Column 11, Line 32, delete ""regular"." and insert --"regular",-- therefor In Column 11, Line 45, delete "NOT" and insert --not-- therefor In Column 11, Line 48, delete "Instead." and insert --Instead,-- therefor In Column 12, Line 1, delete ""zeroed out."" and insert --"zeroed out,"-- therefor In Column 12, Line 50, delete "Namely." and insert --Namely,-- therefor In Column 13, Line 11, delete "("slid" and insert --("slide-- therefor In Column 14, Line 7, delete "channels)," and insert --channels,-- therefor In Column 14, Line 17, delete "4.4," and insert --4,4,-- therefor In Column 14, Line 35, delete "channels -1" and insert --channels-1-- therefor In Column 14, Line 67, delete "herein." and insert --herein,-- therefor In Column 15, Line 14, delete ""slid" and insert --"slide-- therefor In Column 15, Line 54, delete "Specifically." and insert --Specifically,-- therefor In Column 18, Line 20, delete "Smalltalk." and insert --Smalltalk,-- therefor In the Claims In Column 21, Line 4, in Claim 10, delete "Tth" and insert --T$^{th}$-- therefor In Column 22, Line 29, in Claim 18, after "wherein", delete "a"